(12) United States Patent
Hori

(10) Patent No.: US 11,631,912 B2
(45) Date of Patent: Apr. 18, 2023

(54) COOLER WITH COMPARTMENT FOR A REPLACEABLE BATTERY

(71) Applicant: MAKITA CORPORATION, Anjo (JP)

(72) Inventor: Atsushi Hori, Anjo (JP)

(73) Assignee: MAKITA CORPORATION, Anjo (JP)

( * ) Notice: Subject to any disclaimer, the term of this patent is extended or adjusted under 35 U.S.C. 154(b) by 115 days.

(21) Appl. No.: 17/166,146

(22) Filed: Feb. 3, 2021

(65) Prior Publication Data
US 2021/0320350 A1 Oct. 14, 2021

(30) Foreign Application Priority Data
Apr. 9, 2020 (JP) .............................. JP2020-070386

(51) Int. Cl.
| | |
|---|---|
| *H01M 50/207* | (2021.01) |
| *F25D 11/00* | (2006.01) |
| *F25D 23/00* | (2006.01) |
| *H01M 10/6564* | (2014.01) |
| *F25D 11/02* | (2006.01) |
| *F25D 29/00* | (2006.01) |

(52) U.S. Cl.
CPC ....... *H01M 10/6564* (2015.04); *F25D 11/003* (2013.01); *F25D 11/02* (2013.01); *F25D 23/006* (2013.01); *F25D 29/003* (2013.01); *H01M 50/207* (2021.01); *F25D 11/00* (2013.01)

(58) Field of Classification Search
CPC ... B25F 5/008; H01M 10/613; H01M 10/623; H01M 10/6563; H01M 10/6564; H01M 2220/30; H01M 50/247; B25D 17/20; B25D 2217/0061; F25B 27/00; F25D 11/00; Y02B 40/00
See application file for complete search history.

(56) References Cited

U.S. PATENT DOCUMENTS

| | | | | |
|---|---|---|---|---|
| 6,799,434 | B1* | 10/2004 | Hobbs, Jr. ............... | F25D 29/00 62/530 |
| 2005/0202310 | A1* | 9/2005 | Yahnker ................ | H01M 50/24 429/62 |
| 2007/0240442 | A1* | 10/2007 | Costanzo ............. | F25B 27/005 62/235.1 |
| 2017/0259956 | A1* | 9/2017 | Hori ....................... | A45C 13/02 |
| 2018/0224181 | A1* | 8/2018 | Lockwood ............. | F25D 11/00 |
| 2019/0097280 | A1* | 3/2019 | You ..................... | H01M 10/627 |
| 2020/0018536 | A1* | 1/2020 | Rosell ..................... | F25D 3/107 |
| 2020/0116413 | A1* | 4/2020 | Aaron ..................... | F25D 19/02 |
| 2020/0132356 | A1* | 4/2020 | Tang ..................... | F25D 23/02 |
| 2020/0232695 | A1* | 7/2020 | Lehman ................ | F25D 19/003 |
| 2021/0333035 | A1* | 10/2021 | Alexander ............. | F25D 17/06 |
| 2021/0351466 | A1* | 11/2021 | Wang ..................... | B60L 50/66 |

FOREIGN PATENT DOCUMENTS

JP 3207350 B2 9/2001

\* cited by examiner

*Primary Examiner* — Imran Akram
(74) *Attorney, Agent, or Firm* — Oliff PLC

(57) ABSTRACT

A cooler allows easy attachment and detachment of a battery. The cooler includes a main container including a refrigeration compartment, an evaporator on the main container, a compressor and a condenser adjacent to the main container, and at least one battery mount to receive a power tool battery in a detachable manner. The at least one battery mount is adjacent to the main container and above the compressor and the condenser.

13 Claims, 12 Drawing Sheets

COOLER WITH COMPARTMENT FOR A REPLACEABLE BATTERY

CROSS-REFERENCE TO RELATED APPLICATIONS

This application claims the benefit of priority to Japanese Patent Application No. 2020-070386, filed on Apr. 9, 2020, the entire contents of which are hereby incorporated by reference.

BACKGROUND

1. Technical Field

The present disclosure relates to a cooler.

2. Description of the Background

In the field related to coolers, a cooler is known as described in Japanese Patent No. 3207350 (Patent Literature 1). The cooler in Patent Literature 1 includes a compressor and a condenser accommodated in a machinery compartment, and a battery to power the compressor and the condenser accommodated in a battery compartment located below the machinery compartment.

BRIEF SUMMARY

A battery as a power supply for a cooler is to be easily attachable and detachable.

One or more aspects of the present disclosure are directed to a cooler that allows easy attachment and detachment of a battery.

An aspect of the present disclosure provides a cooler, including:
 a main container including a refrigeration compartment;
 an evaporator on the main container;
 a compressor and a condenser adjacent to the main container; and
 at least one battery mount to receive a power tool battery in a detachable manner, the at least one battery mount being adjacent to the main container and above the compressor and the condenser.

The cooler according to the above aspect of the present disclosure allows easy attachment and detachment of a battery.

DETAILED DESCRIPTION

Although one or more embodiments of the present disclosure are described with reference to the drawings, the present disclosure is not limited to the embodiments. The components in the embodiments described below may be combined as appropriate. One or more components may be eliminated.

In the embodiments, the positional relationships between the components will be described using the directional terms such as front and rear (or forward and backward), right and left (or rightward and leftward), and up and down. The terms indicate relative positions or directions with respect to the center of a cooler 1.

Cooler

Figure 1:
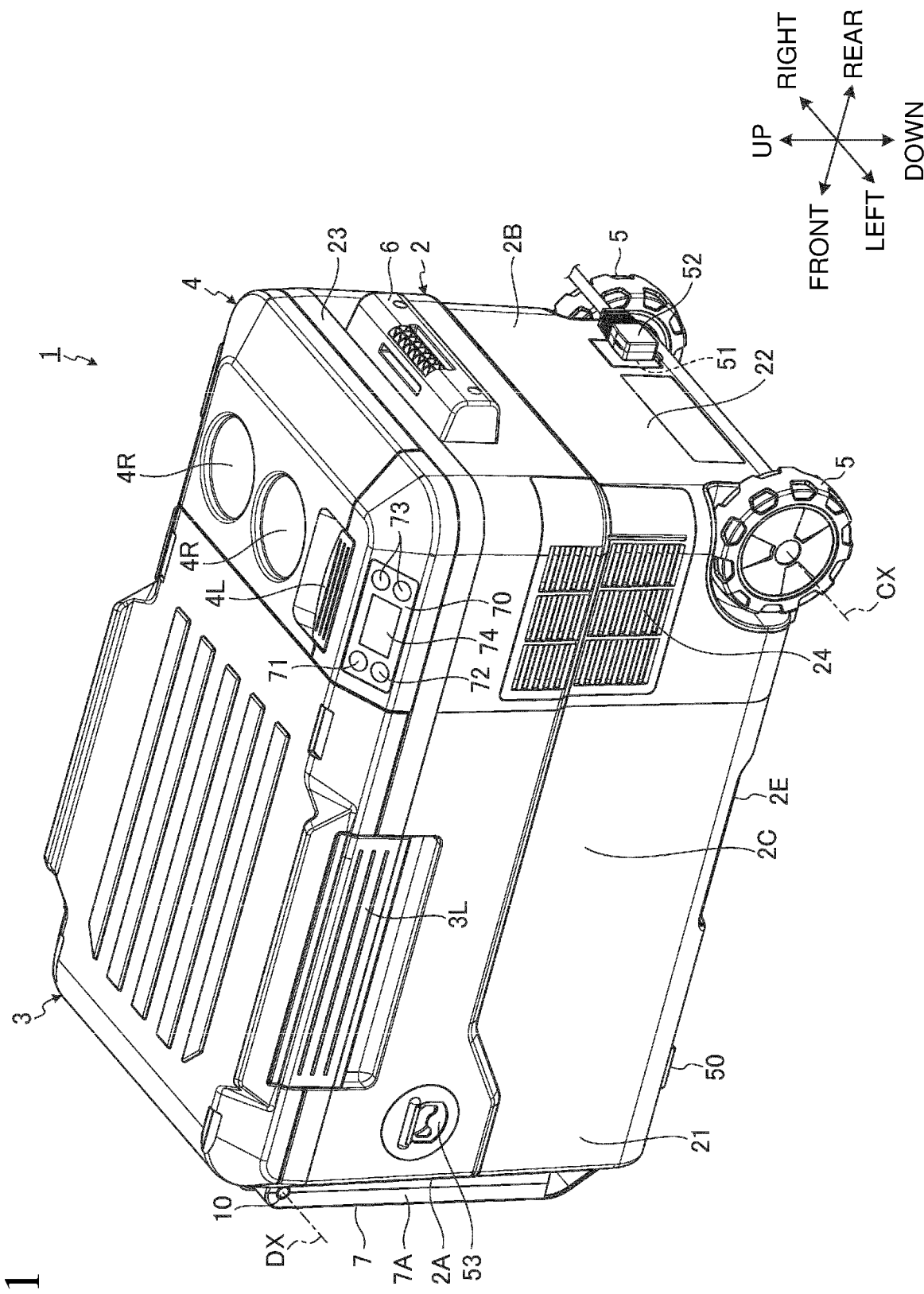
FIG. 1 is a rear perspective view of a cooler according to an embodiment.
Figure 2:
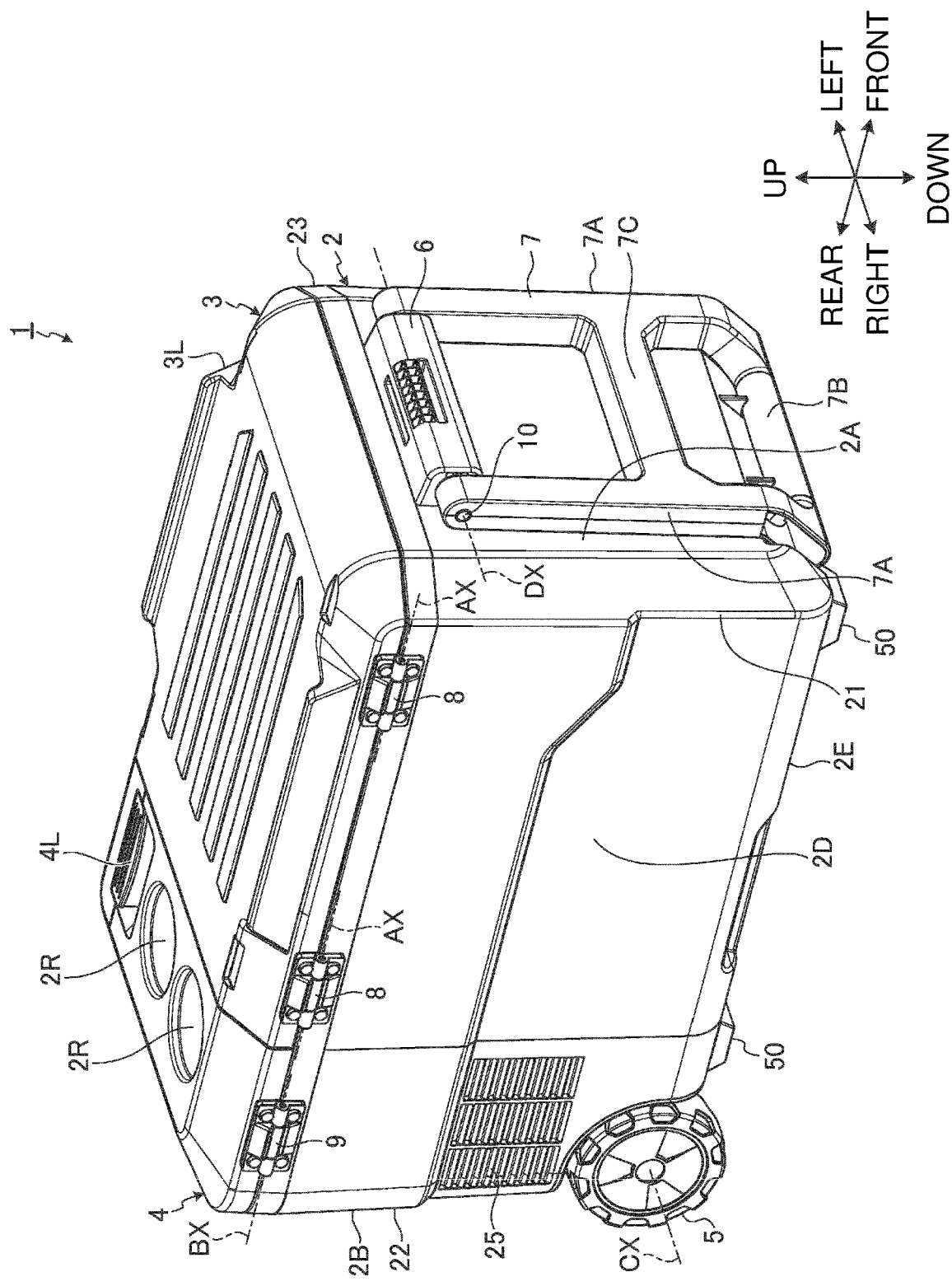
FIG. 2 is a front perspective view of the cooler according to the embodiment.
Figure 3:
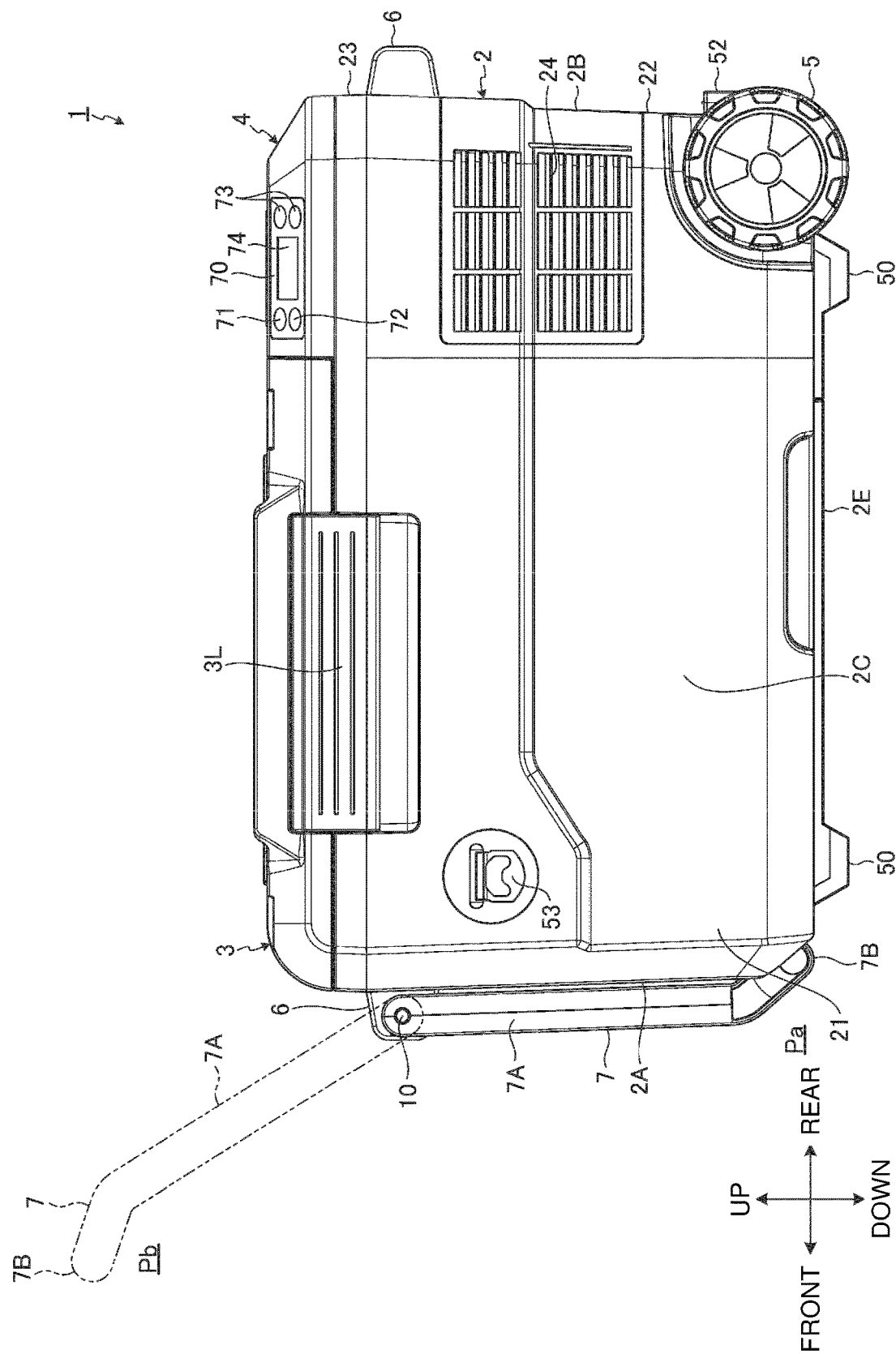
FIG. 3 is a left side view of the cooler according to the embodiment.

FIG. 1 is a rear perspective view of the cooler 1 according to an embodiment. FIG. 2 is a front perspective view of the cooler 1 according to the embodiment. FIG. 3 is a left side view of the cooler 1 according to the embodiment.

The cooler 1 has cooling capabilities to keep products cold. The cooler 1 according to the embodiment also has warming capabilities to keep products warm. In other words, the cooler 1 in the embodiment functions as a cooler and warmer.

As shown in FIGS. 1 to 3, the cooler 1 includes a housing 2, a refrigeration compartment cover 3, a battery compartment cover 4, casters 5, a pair of handles 6, and a carrier handle 7.

The housing 2 is an enclosure of the cooler 1. The housing 2 has a front surface 2A, a rear surface 2B, a left surface 2C, a right surface 2D, and a bottom surface 2E. The housing 2 has an opening at the top. The housing 2 has four legs 50 on the bottom surface 2E. The legs 50 protrude downward from the bottom surface 2E.

The housing 2 in the embodiment includes a front housing 21, a rear housing 22, and a frame housing 23. The rear housing 22 is located rearward from the front housing 21. The front housing 21 has a rear edge connected to a front edge of the rear housing 22. The frame housing 23 is connected to an upper edge of the front housing 21 and to an upper edge of the rear housing 22. The front housing 21 includes the front surface 2A, a front portion of the left surface 2C, a front portion of the right surface 2D, and a front portion of the bottom surface 2E. The rear housing 22 includes the rear surface 2B, a rear portion of the left surface 2C, a rear portion of the right surface 2D, and a rear portion of the bottom surface 2E.

The refrigeration compartment cover 3 covers a part of the opening of the housing 2. The refrigeration compartment cover 3 in the embodiment covers a front part of the opening of the housing 2. The refrigeration compartment cover 3 is joined to the housing 2 with hinge assemblies 8. The hinge assemblies 8 in the embodiment join a right edge of the refrigeration compartment cover 3 to an upper portion of the right surface 2D of the front housing 21. The hinge assemblies 8 have their hinge axis AX extending in the front-rear direction. The refrigeration compartment cover 3 is pivotable about the hinge axis AX of the hinge assemblies 8. The refrigeration compartment cover 3 has the right edge connected to the hinge assemblies 8 and thus has its left edge pivotable about the hinge axis AX.

The battery compartment cover 4 covers a part of the opening of the housing 2. The battery compartment cover 4 is located rearward from the refrigeration compartment cover 3 and covers a rear part of the opening of the housing 2. The battery compartment cover 4 is joined to the housing 2 with a hinge assembly 9. The hinge assembly 9 in the embodiment joins a right edge of the battery compartment cover 4 to an upper portion of the right surface 2D of the rear housing 22. The hinge assembly 9 has its hinge axis BX extending in the front-rear direction. The battery compartment cover 4 is pivotable about the hinge axis BX of the hinge assembly 9. The battery compartment cover 4 has the right edge connected to the hinge assembly 9 and thus has its left edge pivotable about the hinge axis BX.

In the embodiment, the hinge axis AX and the hinge axis BX substantially align with each other. The refrigeration compartment cover 3 and the battery compartment cover 4 are pivotable in substantially the same direction.

The casters 5 each have wheels or rollers. The casters 5 are rotatably supported on a rear bottom portion of the housing 2. The casters 5 each have a rotation axis CX extending in the right-left direction.

The handles 6 are gripped by a user of the cooler 1. The pair of handles 6 include a first handle 6 fixed on an upper portion of the front surface 2A, and a second handle 6 fixed on an upper portion of the rear surface 2B. The first handle 6 protrudes frontward from the front surface 2A. The second handle 6 protrudes rearward from the rear surface 2B. The user of the cooler 1 grips the pair of handles 6 to lift the cooler 1.

The carrier handle 7 is gripped by the user of the cooler 1. The carrier handle 7 includes a pair of arms 7A, a handle portion 7B, and a connector 7C. The handle portion 7B connects a distal end of a first arm 7A to a distal end of a second arm 7A. The connector 7C connects a middle portion of the first arm 7A to a middle portion of the second arm 7A. The carrier handle 7 is joined to the housing 2 with a hinge assembly 10. The handles 6 fixed on the upper portion of the front surface 2A include the hinge assembly 10 in the embodiment. The hinge assembly 10 has its hinge axis DX extending in the right-left direction. The carrier handle 7 is pivotable about the hinge axis DX of the hinge assembly 10. Each arm 7A has a basal end connected to the hinge assembly 10, and thus the handle portion 7B is pivotable about the hinge axis DX.

As shown in FIG. 3, the carrier handle 7 is pivotable to a retracted position Pa and to an in-use position Pb. At the retracted position Pa, the carrier handle 7 has the handle portion 7B below the hinge assembly 10, and the arms 7A facing the front surface 2A of the housing 2. At the in-use position Pb, the carrier handle 7 has the arms 7A away from the front surface 2A of the housing 2, and the handle portion 7B above the hinge assembly 10. The user of the cooler 1 moves the carrier handle 7 to the in-use position Pb, and then can walk while gripping the handle portion 7B. While the user of the cooler 1 gripping the handle portion 7B is walking, the casters 5 are in contact with the ground and the legs 50 remain away from the ground. With the casters 5 rotating, the user of the cooler 1 can easily move the cooler 1.

An alternating-current (AC) adapter 51 connectable to utility power is located on a lower right portion of the rear surface 2B. The AC adapter 51 is covered by a cover 52. A cap opener 53 is located on a front portion of the left surface 2C.

Figure 4:
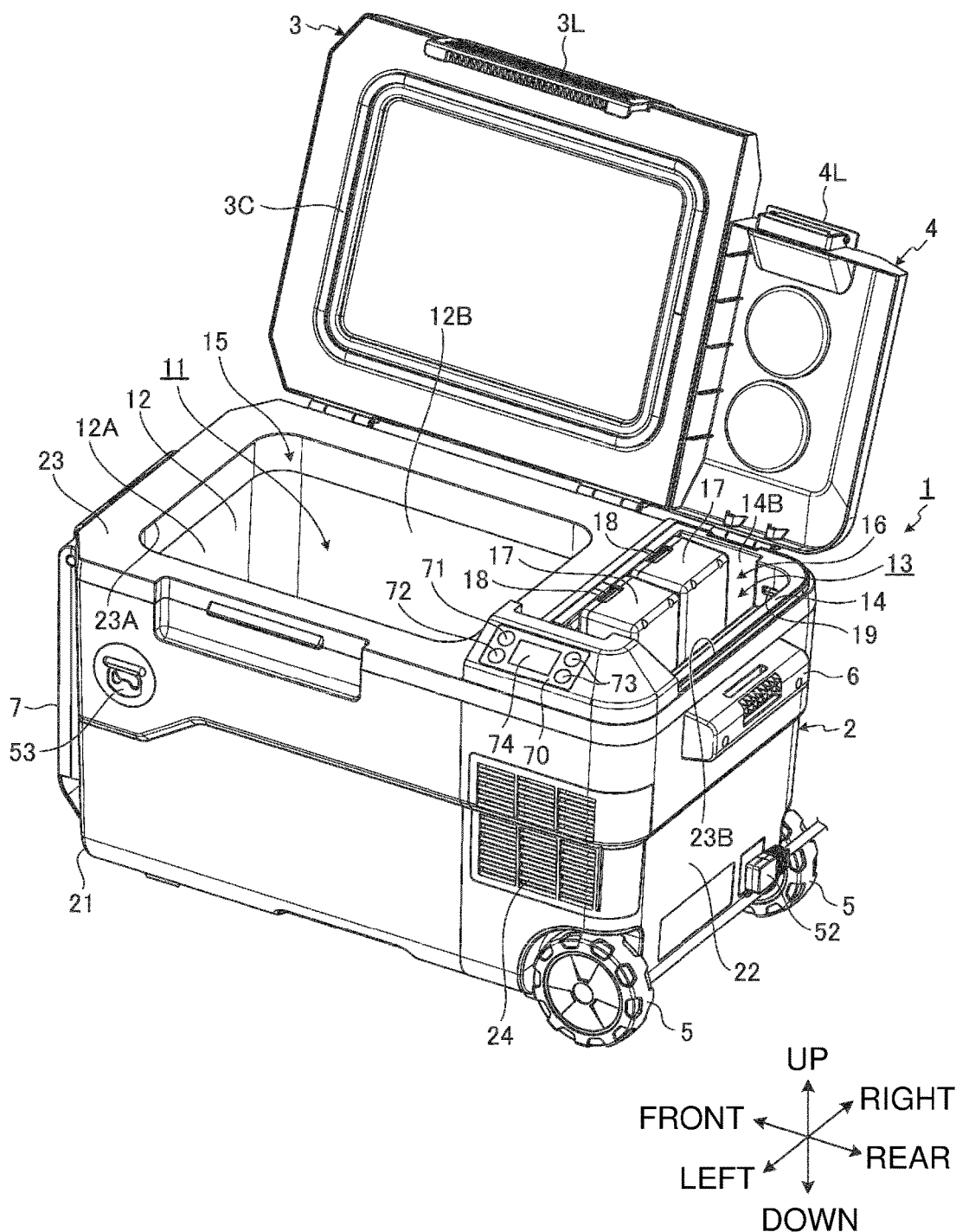
FIG. 4 is a rear perspective view of the cooler according to the embodiment.
Figure 5:
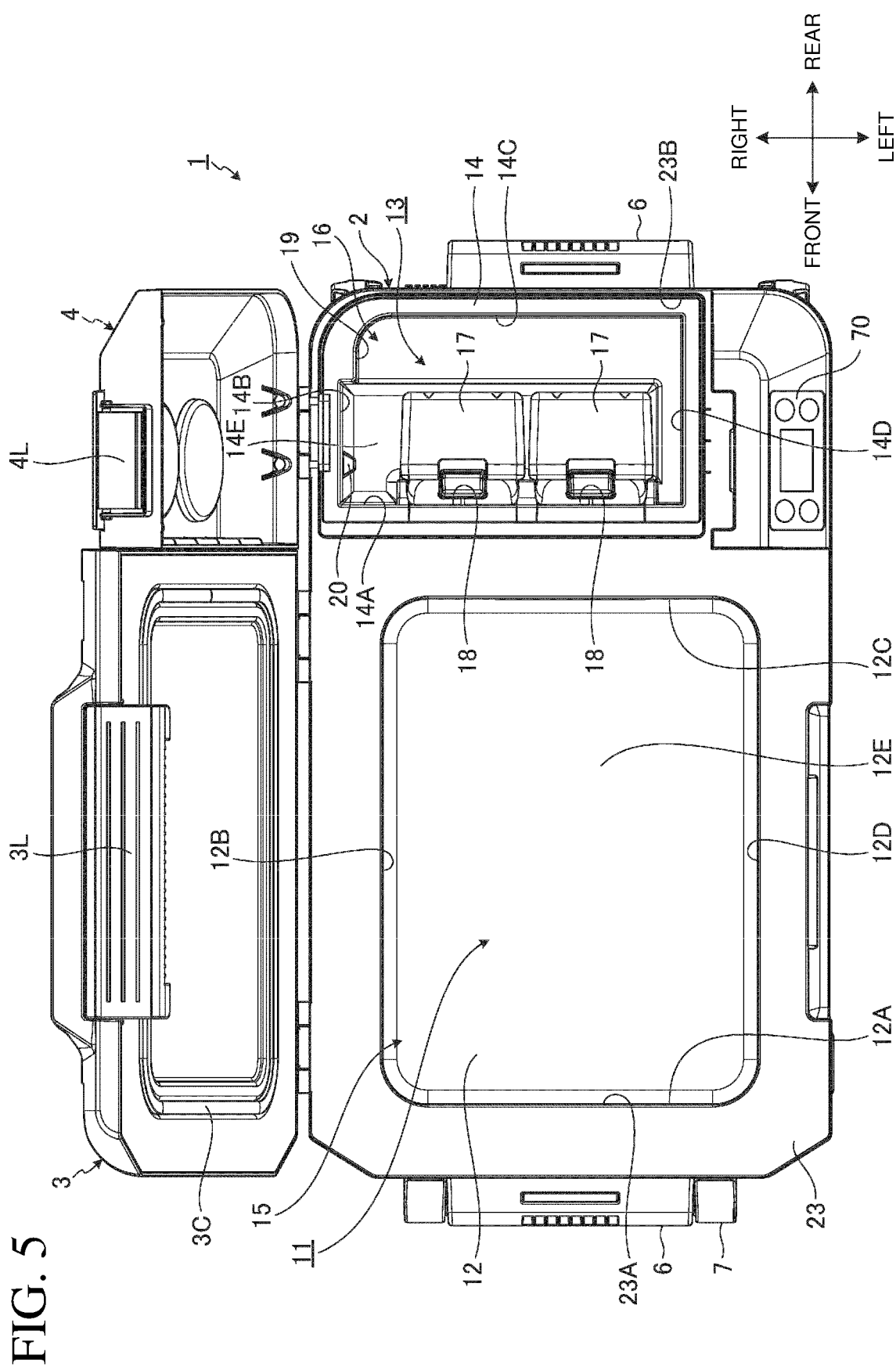
FIG. 5 is a top view of the cooler according to the embodiment.

FIG. 4 is a rear perspective view of the cooler 1 according to the embodiment. FIG. 5 is a top view of the cooler 1 according to the embodiment. In FIG. 4, the refrigeration compartment cover 3 is pivoted rightward. In FIG. 5, the battery compartment cover 4 is pivoted rightward.

As shown in FIGS. 4 and 5, the cooler 1 includes a main container 12 and a battery container 14. The main container 12 has a refrigeration compartment 11. The battery container 14 has a battery compartment 13. The battery container 14 is located adjacent to the main container 12. The battery container 14 in the embodiment is located rearward from the main container 12. The main container 12 is accommodated in the front housing 21. The battery container 14 is accommodated in the rear housing 22.

The main container 12 has a first inner surface 12A, a second inner surface 12B, a third inner surface 12C, a fourth inner surface 12D, and a bottom surface 12E.

The first inner surface 12A faces rearward. The second inner surface 12B faces leftward. The third inner surface 12C faces frontward. The fourth inner surface 12D faces rightward. The bottom surface 12E faces upward. The first inner surface 12A and the third inner surface 12C face each other. The second inner surface 12B and the fourth inner surface 12D face each other. The bottom surface 12E meets a lower end of the first inner surface 12A, a lower end of the second inner surface 12B, a lower end of the third inner surface 12C, and a lower end of the fourth inner surface 12D.

Of the first inner surface 12A, the second inner surface 12B, the third inner surface 12C, the fourth inner surface 12D, and the bottom surface 12E, the second inner surface 12B is closest to the hinge assemblies 8. The third inner surface 12C is closest to the battery compartment 13.

The refrigeration compartment 11 is defined by the first inner surface 12A, the second inner surface 12B, the third inner surface 12C, the fourth inner surface 12D, and the bottom surface 12E. The refrigeration compartment 11 has an opening 15 at the top.

The cooler 1 according to the embodiment functions as a cooler and warmer. The refrigeration compartment 11 functions as a refrigeration and heating compartment. Products to be kept cold or warm are stored into the refrigeration compartment 11.

The battery container 14 has a first inner surface 14A, a second inner surface 14B, a third inner surface 14C, a fourth inner surface 14D, and a bottom surface 14E.

The first inner surface 14A faces rearward. The second inner surface 14B faces leftward. The third inner surface 14C faces frontward. The fourth inner surface 14D faces rightward. The bottom surface 14E faces upward. The first inner surface 14A and the third inner surface 14C face each other. The second inner surface 14B and the fourth inner surface 14D face each other. The bottom surface 14E meets a lower end of the first inner surface 14A, a lower end of the second inner surface 14B, a lower end of the third inner surface 14C, and a lower end of the fourth inner surface 14D.

Of the first inner surface 14A, the second inner surface 14B, the third inner surface 14C, the fourth inner surface 14D, and the bottom surface 14E, the second inner surface 14B is closest to the hinge assembly 9. The first inner surface 14A is closest to the refrigeration compartment 11.

The battery compartment 13 is defined by the first inner surface 14A, the second inner surface 14B, the third inner surface 14C, the fourth inner surface 14D, and the bottom surface 14E. The battery compartment 13 has an opening 16 at the top.

The frame housing 23 has a first opening 23A and a second opening 23B. The second opening 23B is located rearward from the first opening 23A. The opening 15 of the refrigeration compartment 11 is located inside the first opening 23A and connects to the first opening 23A. The opening 16 of the battery compartment 13 is located inside the second opening 23B.

The battery compartment 13 accommodates multiple (two in the embodiment) battery mounts 18 to each receive a power tool battery 17.

The battery mounts 18 are on the first inner surface 14A of the battery compartment 13. The two battery mounts 18 are arranged in the right-left direction on the first inner surface 14A. The refrigeration compartment cover 3 covers and uncovers the opening 15 of the refrigeration compartment 11. The refrigeration compartment cover 3 is pivoted with its left edge away from the frame housing 23 to uncover the opening 15. The refrigeration compartment cover 3 is pivoted with its left edge toward the frame housing 23 to cover the opening 15. The refrigeration compartment cover 3 includes a latch assembly 3L. With the refrigeration compartment cover 3 covering the opening 15 of the refrigeration compartment 11, the latch assembly 3L is at the left edge of the refrigeration compartment cover 3. The latch assembly 3L fastens the refrigeration compartment cover 3 and the frame housing 23 together.

The refrigeration compartment cover 3 in the embodiment includes a heat insulator. The refrigeration compartment cover 3 has a seal 3C on its inner surface. The seal 3C is a rubber ring. When the refrigeration compartment cover 3 uncovers the opening 15 of the refrigeration compartment 11, the seal 3C comes in contact with the upper surface of the frame housing 23. The seal 3C in contact with the upper surface of the frame housing 23 hermetically seals the refrigeration compartment 11.

The battery compartment cover 4 covers and uncovers the opening 16 of the battery compartment 13. The battery compartment cover 4 is pivoted with its left edge away from the frame housing 23 to uncover the opening 16. The battery compartment cover 4 is pivoted with its left edge toward the frame housing 23 to cover the opening 16. The battery compartment cover 4 includes a latch assembly 4L. With the battery compartment cover 4 covering the opening 16 of the battery compartment 13, the latch assembly 4L is at the left edge of the battery compartment cover 4. The latch assembly 4L fastens the battery compartment cover 4 and the frame housing 23 together.

As shown in FIGS. 1 and 2, the battery compartment cover 4 has two recesses 4R on its surface in the embodiment. The user of the cooler 1 can place a cup in either recess 4R.

Power Tool Battery and Battery Compartment

Figure 6:
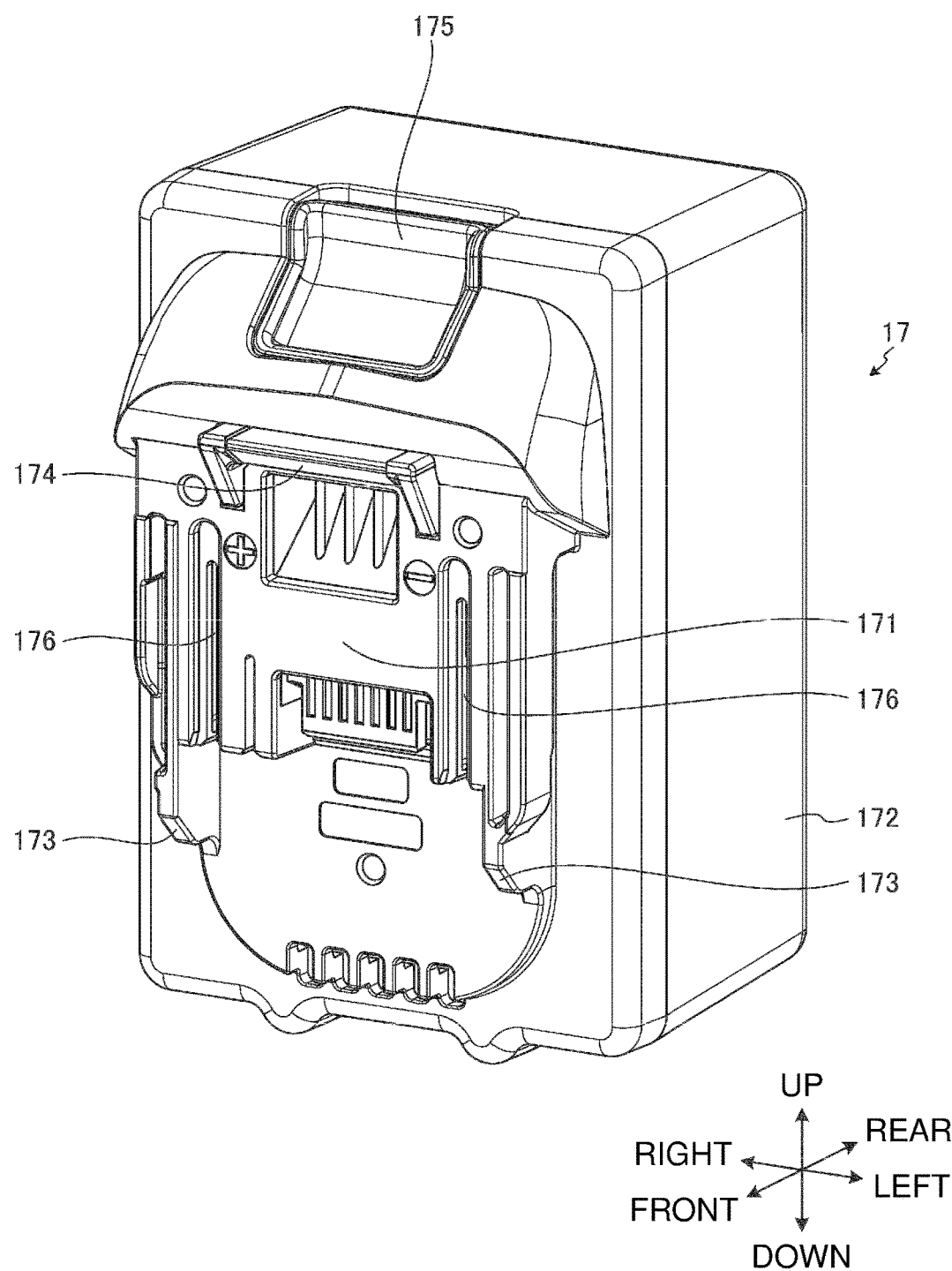
FIG. 6 is a perspective view of a power tool battery in an embodiment.
Figure 7:
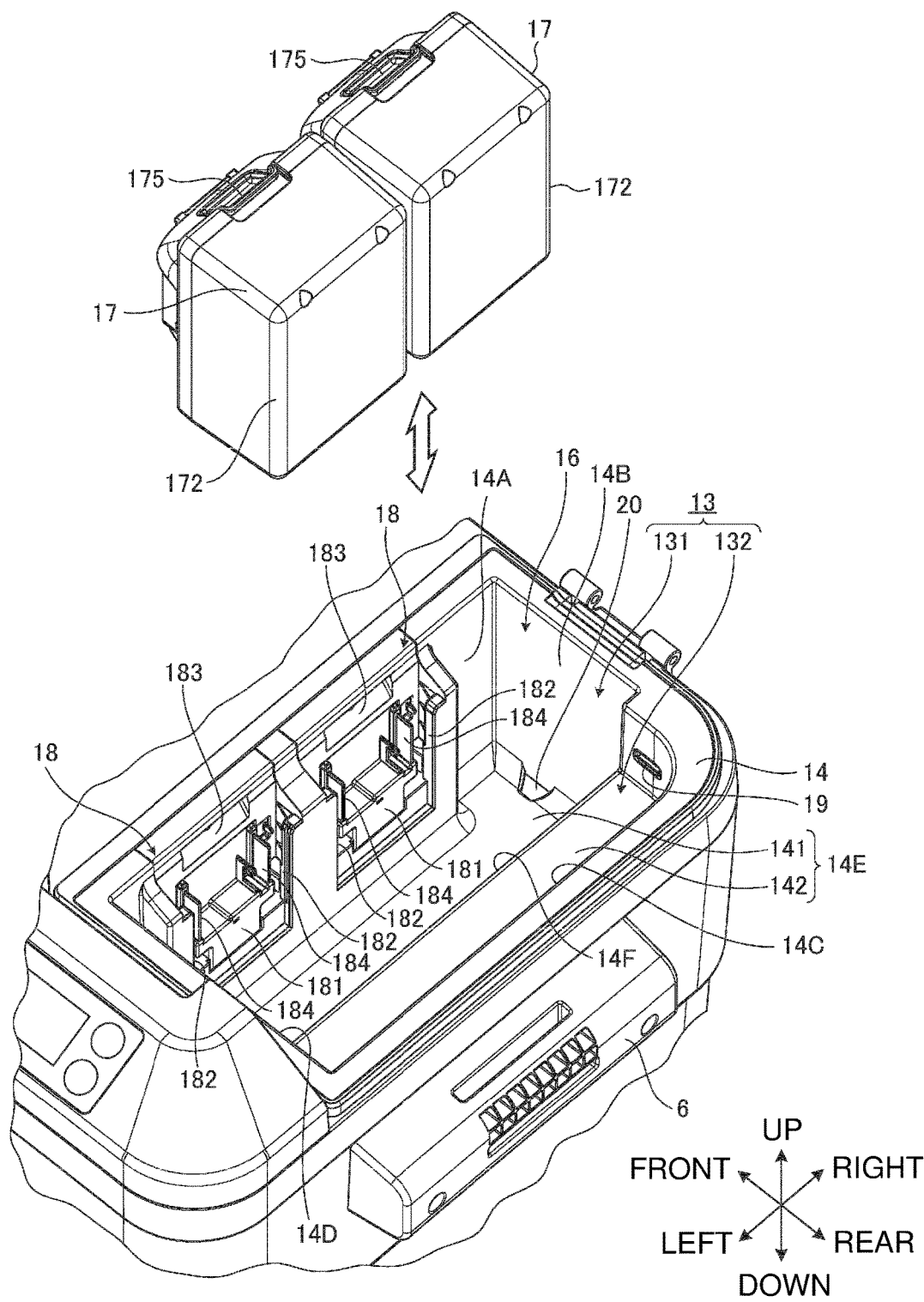
FIG. 7 is a perspective view of power tool batteries and battery mounts in the embodiment.

FIG. 6 is a perspective view of one power tool battery 17 in the embodiment. FIG. 7 is a perspective view of the power tool batteries 17 and the battery mounts 18 in the embodiment.

The power tool batteries 17 provide power to the cooler 1. The power tool batteries 17 thus function as a power supply for the cooler 1. The power tool batteries 17 may be secondary batteries. The power tool batteries 17 may be rechargeable lithium-ion batteries in the present embodiment.

The power tool batteries 17 are attached to the battery mounts 18 to provide power to the cooler 1.

Each power tool battery 17 includes a housing 172, a pair of slides 173, a protrusion 174, and a release button 175. The housing 172 includes a mount surface 171 to face a mount surface 181 of the battery mount 18. The pair of slides 173 are on the mount surface 171. The protrusion 174 is supported movably on the housing 172. The release button 175 is operable to move the protrusion 174.

The housing 172 has an internal space to accommodate a battery cell. The battery cell may be a rechargeable lithium-ion battery.

The slides 173 extend in the up-down direction. The battery mount 18 includes guides 182 to guide the power tool battery 17 in the up-down direction. The slides 173 are guided by the guides 182 on the battery mount 18.

The protrusion 174 protrudes from the mount surface 171. The protrusion 174 is supported movably by a spring. The protrusion 174 protrudes from the mount surface 171 under an elastic force from the spring. The protrusion 174 can be received in a lock slot 183 in the battery mount 18. With the protrusion 174 received in the lock slot 183, the battery mount 18 and the power tool battery 17 are fastened together.

The release button 175 is operable to release the power tool battery 17 fastened on the battery mount 18.

To attach the power tool battery 17 to the battery mount 18, the user of the cooler 1 slides the power tool battery 17 downward along the battery mount 18 after placing the slides 173 along the guides 182 on the battery mount 18. The power tool battery 17 is guided by the guides 182 to move downward. With the protrusion 174 received in the lock slot 183 in the battery mount 18, the power tool battery 17 is fastened on the battery mount 18. In this manner, the power tool battery 17 is attached to the battery mount 18.

Each power tool battery 17 includes a pair of power terminals 176 between the pair of slides 173. One power terminal 176 is a positive power terminal, and the other power terminal 176 is a negative power terminal. The power terminals 176 on the power tool battery 17 are connected to a power terminal 184 on the battery mount 18 to provide power from the power tool battery 17 to the cooler 1.

To remove the power tool battery 17 from the battery mount 18, the user of the cooler 1 operates the release button 175. The protrusion 174 is thus removed from the lock slot 183 to release the power tool battery 17 fastened to the battery mount 18. The power tool battery 17 is then slid upward and removed from the battery mount 18.

In this manner, the power tool battery 17 is slid in the up-down direction for attachment to and detachment from the battery mount 18. The battery compartment cover 4 is pivoted to uncover the opening 16 of the battery compartment 13 before the power tool battery 17 is attached to or detached from the battery mount 18.

As described above, the battery compartment 13 is defined by the first inner surface 14A, the second inner surface 14B, the third inner surface 14C, the fourth inner surface 14D, and the bottom surface 14E. As shown in FIG. 7, the bottom surface 14E includes a first bottom surface 141 and a second bottom surface 142. The second bottom surface 142 is located above the first bottom surface 141. The first bottom surface 141 is located frontward from the second bottom surface 142. This forms a step between the first bottom surface 141 and the second bottom surface 142. The first bottom surface 141 has a rear end connected to a front end of the second bottom surface 142 with a step surface 14F. The step surface 14F faces frontward.

The battery compartment 13 includes a first space 131 and a second space 132. The first space 131 is located frontward from the second space 132. The first space 131 is defined by the first inner surface 14A, a front portion of the second inner surface 14B, the step surface 14F, a front portion of the fourth inner surface 14D, and the first bottom surface 141. The second space 132 is defined by a rear portion of the second inner surface 14B, the third inner surface 14C, a rear portion of the fourth inner surface 14D, and the second bottom surface 142. The first space 131 is deeper than the second space 132.

The first space 131 accommodates the battery mounts 18 and the power tool batteries 17. As shown in FIGS. 4, 5, and 7, the battery compartment 13 accommodates an output terminal 19 on the second inner surface 14B. In the embodiment, the single output terminal 19 is on the second inner surface 14B of the second space 132.

The output terminal 19 in the embodiment is a universal serial bus (USB) terminal. The output terminal 19 is used to output power from the power tool batteries 17. When, for example, an electronic device such as a mobile terminal includes a rechargeable battery, the cooler 1 can charge the battery charger in the electronic device. The electronic device and the output terminal 19 are connected to each other with a USB cable. The rechargeable battery in the electronic device is charged with power output from the power tool batteries 17 through the output terminal 19.

The battery compartment 13 has a hole 20 in the bottom surface 14E. The battery mounts 18 and the output terminal 19 are located above the hole 20 in the battery compartment 13. In the embodiment, the hole 20 is in a right end of the first bottom surface 141. For example, water entering the battery compartment 13 can be discharged through the hole 20. With the hole 20, water is less likely to remain on the battery mounts 18 and the output terminal 19.

Cooling Unit

Figure 8:
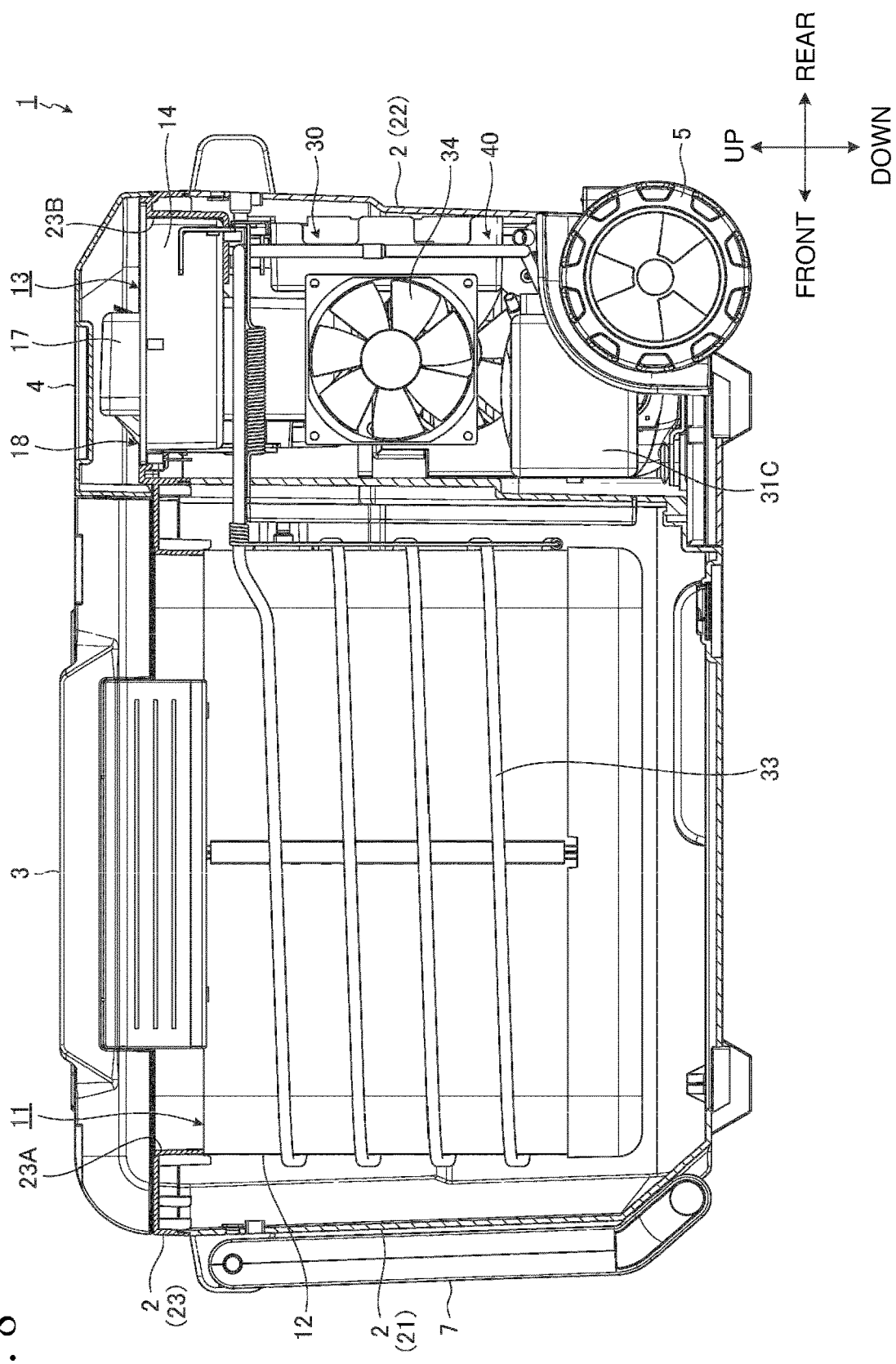
FIG. 8 is a left side view of the cooler according to the embodiment partially being cut away.
Figure 9:
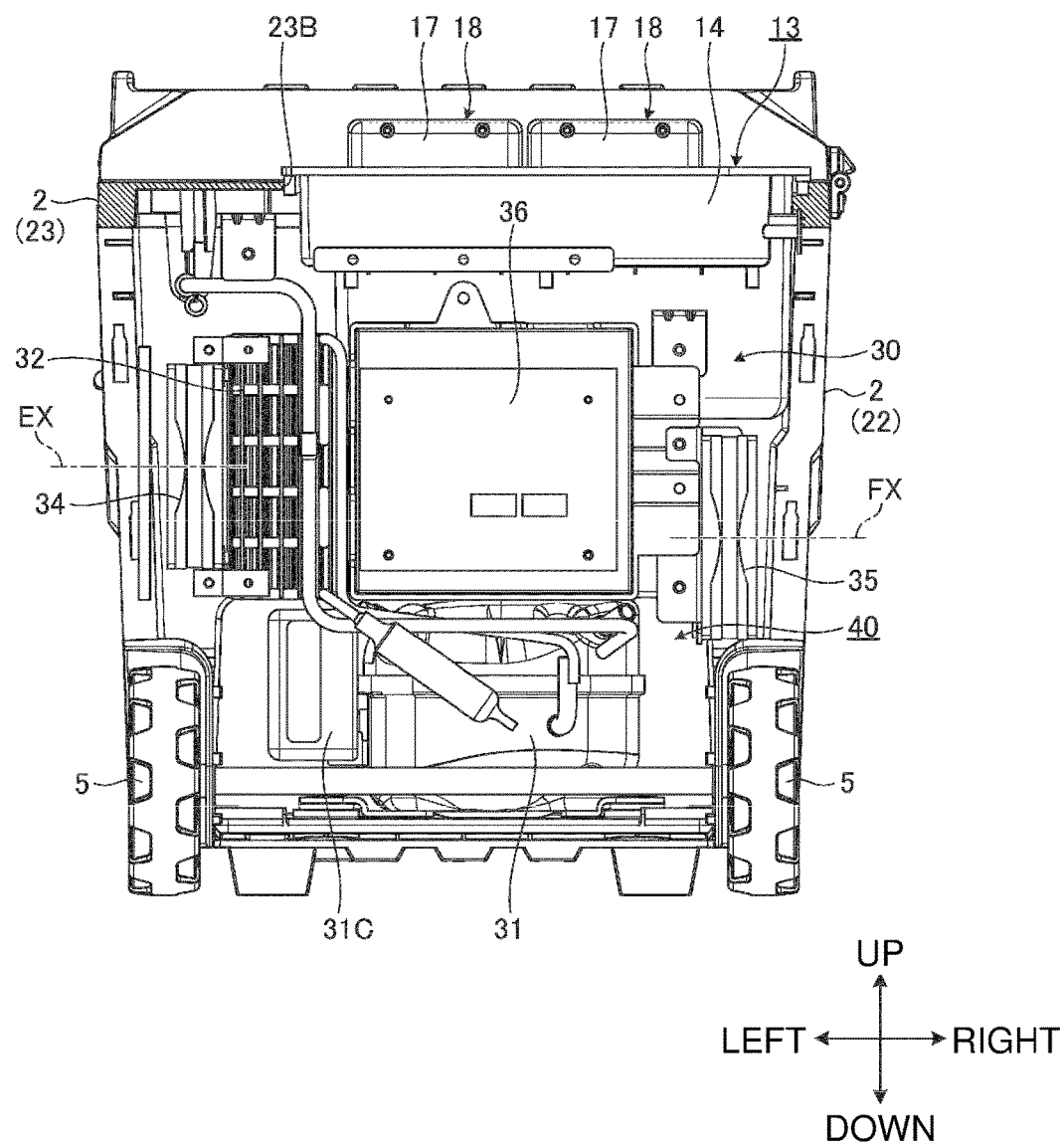
FIG. 9 is a rear view of the cooler according to the embodiment partially being cut away.
Figure 10:
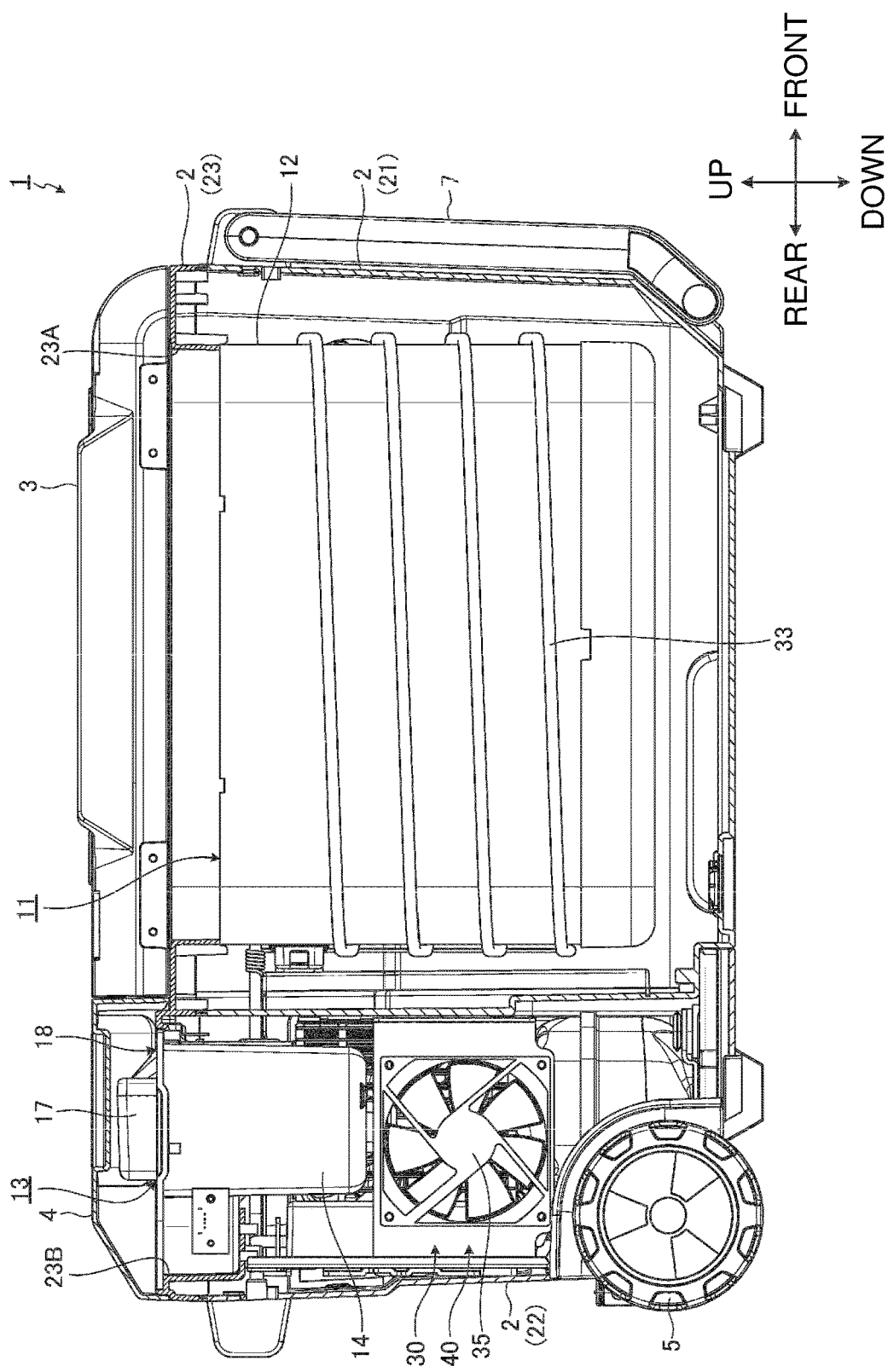
FIG. 10 is a right side view of the cooler according to the embodiment partially being cut away.

FIG. 8 is a left side view of the cooler 1 according to the embodiment partially being cut away. FIG. 9 is a rear view of the cooler 1 according to the embodiment partially being cut away. FIG. 10 is a right side view of the cooler 1 according to the embodiment partially being cut away.

The cooler 1 includes a cooling unit 30 for cooling the main container 12. The cooling unit 30 includes a compressor 31, a condenser 32, an expansion valve (not shown), and an evaporator 33. The compressor 31, the condenser 32, the expansion valve (not shown), and the evaporator 33 form a refrigerant circulation system.

The compressor 31 compresses a refrigerant gas. The compressor 31 is controlled by a compressor controller 31C. A high-temperature, high-pressure refrigerant gas compressed by the compressor 31 is fed to the condenser 32. The condenser 32 then cools and condenses the refrigerant gas fed from the compressor 31 to produce a refrigerant liquid. The refrigerant liquid produced in the condenser 32 is fed to the expansion valve. The expansion valve depressurizes the refrigerant liquid to lower the boiling point of the refrigerant liquid. The refrigerant liquid with a lower pressure after flowing through the expansion valve is fed to the evaporator 33. The evaporator 33 vaporizes the refrigerant liquid fed from the expansion valve and cools the main container 12 with the heat from vaporization. The refrigerant gas flowing through the evaporator 33 then returns to the compressor 31.

The evaporator 33 is placed on the main container 12. The evaporator 33 includes a pipe placed or wound around the main container 12 in contact with the outer surface of the main container 12.

The compressor 31 and the condenser 32 are located adjacent to the main container 12. The compressor 31 and the condenser 32 in the embodiment are located rearward from the main container 12.

The battery mounts 18 are located adjacent to (or rearward from) the main container 12 and above the compressor 31 and the condenser 32.

A machinery compartment 40 accommodating the compressor 31 and the condenser 32 is located below the battery container 14. The machinery compartment 40 is defined by the rear housing 22.

More specifically, the machinery compartment 40 is located below the battery compartment 13 in the embodiment. The battery compartment 13 accommodates the battery mounts 18 and the power tool batteries 17. The machinery compartment 40 accommodates the compressor 31 and the condenser 32.

The compressor 31 and the condenser 32 are at different positions in the up-down direction. In the machinery compartment 40, the compressor 31 is located below the condenser 32. In the right-left direction, the condenser 32 is leftward from the center of the machinery compartment 40, and the compressor 31 is partially at the center of the machinery compartment 40.

The cooling unit 30 includes an intake fan 34, an exhaust fan 35, and a controller 36.

The machinery compartment 40 accommodates the intake fan 34, the exhaust fan 35, and the controller 36. In the machinery compartment 40, the compressor 31 is located below the intake fan 34, the exhaust fan 35, and the controller 36. The intake fan 34, at least a part of the condenser 32, at least a part of the exhaust fan 35, and at least a part of the controller 36 are at the same position in the up-down direction. A rotation axis FX of the exhaust fan 35 in the embodiment is located below a rotation axis EX of the intake fan 34.

The intake fan 34 rotates about the rotation axis EX extending in the right-left direction. The intake fan 34 is located in a left portion of the machinery compartment 40. The intake fan 34 rotates to cause air outside the housing 2 to flow into the machinery compartment 40. An intake motor (not shown) is joined to the intake fan 34. The intake fan 34 rotates with a rotational force generated by the intake motor. As shown in FIG. 1 and other figures, the rear housing 22 has an inlet 24 in its left portion. The intake fan 34 rotates to cause air outside the housing 2 to flow into the machinery compartment 40 through the inlet 24.

The exhaust fan 35 rotates about the rotation axis FX extending in the right-left direction. The exhaust fan 35 is located in a right portion of the machinery compartment 40. The exhaust fan 35 rotates to cause air in the machinery compartment 40 to flow out of the housing 2. An exhaust motor (not shown) is joined to the exhaust fan 35. The exhaust fan 35 rotates with a rotational force generated by the exhaust motor. As shown in FIG. 2 and other figures, the rear housing 22 has an outlet 25 in its right portion. The exhaust fan 35 rotates to cause air in the machinery compartment 40 to flow out of the housing 2 through the outlet 25.

The controller 36 controls the cooler 1. The controller 36 controls at least the cooling unit 30. The controller 36 includes a circuit board on which multiple electronic components are mounted. Examples of the electronic components mounted on the circuit board include a processor such as a central processing unit (CPU), a nonvolatile memory such as a read-only memory (ROM) or a storage device, a volatile memory such as a random-access memory (RAM), a transistor, and a resistor.

The intake fan 34 is located leftward from the condenser 32. In the right-left direction, the intake fan 34 is between the inlet 24 and the condenser 32. The intake fan 34 faces the condenser 32.

The condenser 32 is located leftward from the controller 36. The exhaust fan 35 is located rightward from the controller 36. In the right-left direction, the exhaust fan 35 is between the controller 36 and the outlet 25.

The intake fan 34 feeds air to the condenser 32 and to the controller 36. The refrigerant gas in the condenser 32 is then cooled and changes to a refrigerant liquid. The intake fan 34 feeds air to the controller 36 to cool the controller 36.

The cooler 1 according to the embodiment has both cooling capabilities and warming capabilities. A heating wire (not shown) is placed around the main container 12. Products stored in the main container 12 are kept warm with heat generated by the heating wire.

Operation Panel

As shown in FIGS. 1 and 3 and other figures, the cooler 1 includes an operation panel 70. The operation panel 70 is located on the left portion of the battery compartment cover 4 and above the left surface 2C of the rear housing 22. The operation panel 70 includes a power button 71, a mode switch button 72, a temperature setting button 73, and a display 74. The user of the cooler 1 operates the power button 71, the mode switch button 72, and the temperature setting button 73. The power button 71 is operable to provide power from the power tool batteries 17 to the cooler 1 to activate the cooler 1. The mode switch button 72 is operable to switch the operation mode between the cooling mode and the warming mode. The temperature setting button 73 is operable to set the target temperature of the main container 12. The display 74 includes a light emitter such as a light-emitting diode. The display 74 displays the operating status of the power button 71, the mode switch button 72, and the temperature setting button 73. The display 74 also displays the remaining battery level of the power tool batteries 17.

Method of Use

A method of using the cooler 1 according to the embodiment will now be described. To attach the power tool batteries 17 to the battery mounts 18, the user of the cooler 1 rotates the battery compartment cover 4 to uncover the opening 16 of the battery compartment 13. With the opening 16 uncovered, the user of the cooler 1 can slide each power tool battery 17 downward along the battery mount 18. Each power tool battery 17 is thus attached to the battery mount 18. In this state, the power button 71 is operable to provide power from the power tool batteries 17 to the cooler 1 to activate the cooler 1. The mode switch button 72 is operable to switch to the cooling mode to activate the cooling unit 30. Products stored in the refrigeration compartment 11 are kept cold.

To charge the rechargeable battery in the electronic device, the user of the cooler 1 connects the electronic device to the output terminal 19 with a USB cable. The rechargeable battery in the electronic device is charged with power output from the power tool batteries 17 through the output terminal 19.

Figure 11:
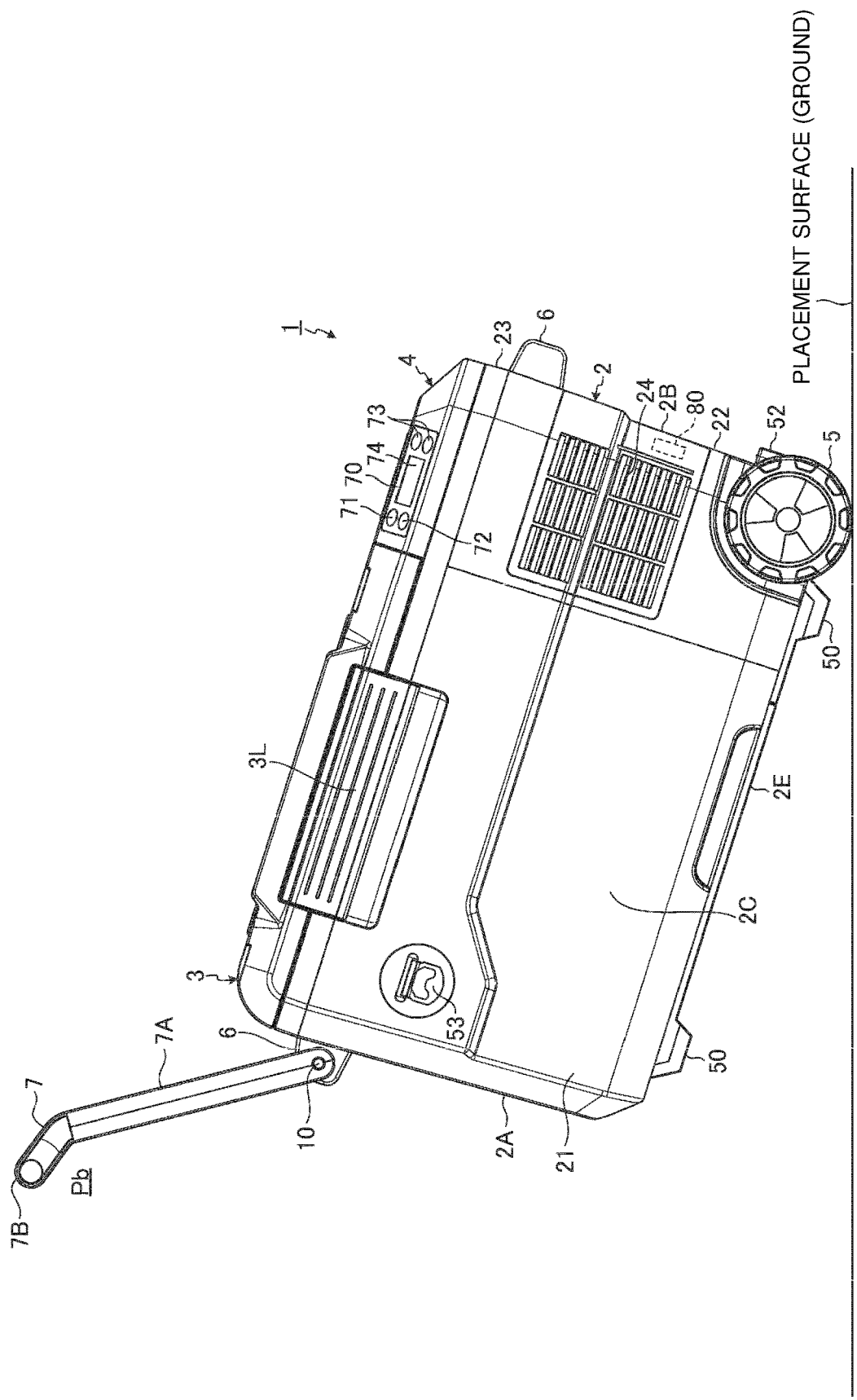
FIG. 11 is a view of the cooler illustrating a tilt sensor in the embodiment.

FIG. 11 is a view of the cooler 1 illustrating a tilt sensor 80 in the embodiment. As shown in FIG. 11, the cooler 1 includes the tilt sensor 80 that detects the tilt angle of the cooling unit 30 with respect to a horizontal plane. The tilt sensor 80 may be included in, for example, the controller 36.

The tilt sensor 80 is, for example, a gyro sensor. The cooling unit 30 is supported on the housing 2. The tilt sensor 80 detects the tilt angle of the cooling unit 30 with respect to the horizontal plane by detecting the tilt angle of the housing 2 with respect to the horizontal plane.

When determining that the tilt angle of the cooling unit 30 exceeds a predetermined threshold angle based on the data obtained by the tilt sensor 80, the controller 36 shuts power from the power tool batteries 17 to the cooling unit 30. This stops the operation of the cooling unit 30. Although the tilt angle of the cooling unit 30 exceeds the threshold angle, power from the power tool batteries 17 is continuously provided to the controller 36, the operation panel 70, and other components.

In response to a predetermined time elapsing from when the tilt angle of the cooling unit 30 decreases below the threshold angle, the controller 36 resumes power from the power tool batteries 17 to the cooling unit 30. This restarts the operation of the cooling unit 30.

To move the cooler 1, the user of the cooler 1 grips the handle portion 7B of the carrier handle 7 moved to the in-use position Pb, and places the cooler 1 tilted with the legs 50 away from the ground and the casters 5 in contact with the ground. The user can then move the tilted cooler 1 while walking. The user may also grip the pair of handles 6 and lift the cooler 1. When, for example, the cooler 1 is tilted for movement or is lifted and thus tilted while the cooling unit 30 is in operation, the power to the cooling unit 30 is shut to stop the operation of the cooling unit 30. When, for example, the cooling unit 30 in operation is tilted, a lubricating oil or a cooling oil may be sucked into the compressor 31. This may cause failures in the compressor 31. In the embodiment, when the cooling unit 30 in operation is tilted to a tilt angle exceeding the threshold angle, the cooling unit 30 stops operating. The threshold angle is set to the tilt angle of the cooling unit 30 that may cause a lubricating oil or a cooling oil to be sucked into the compressor 31. This reduces failures in the compressor 31.

In response to, for example, a predetermined time elapsing from when the cooler 1 moved or lifted is placed onto a placement surface parallel to the horizontal plane, the power to the cooling unit 30 is resumed to restart the operation of the cooling unit 30. The predetermined time is set to the time to be taken from when the cooler 1 is placed on the placement surface to when the lubricating oil or the cooling oil is discharged from the compressor 31. The predetermined time may be set to the time to be taken to protect the motor for the compressor 31 or to reduce the load on the motor to be applied in response to the restart.

Figure 12:
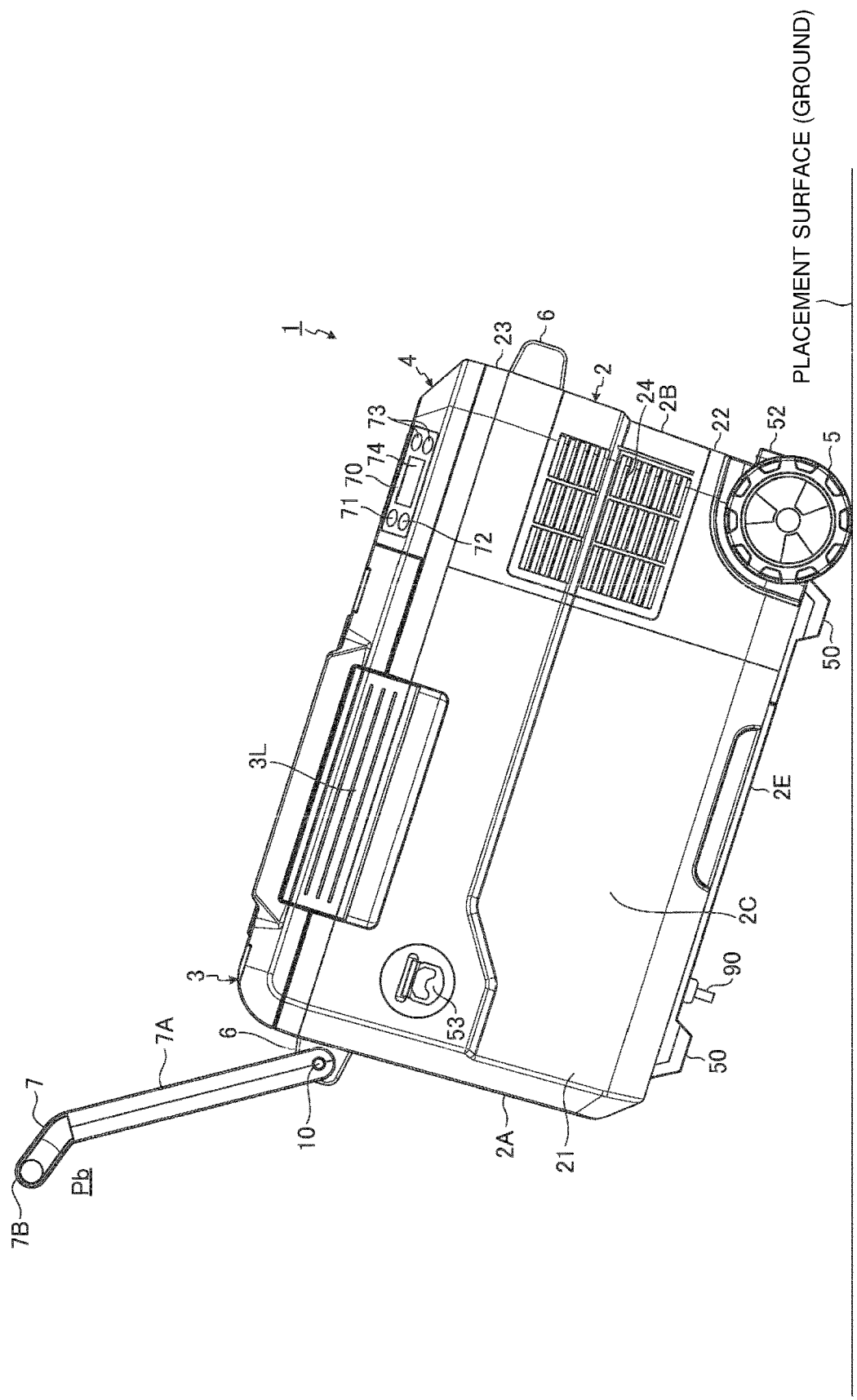
FIG. 12 is a view of the cooler illustrating a push switch in the embodiment.

FIG. 12 is a view of the cooler 1 illustrating a push switch 90 in the embodiment. The cooler 1 may include the push switch 90 shown in FIG. 12 instead of the tilt sensor 80 described with reference to FIG. 11. The push switch 90 protrudes downward from the lower surface of the housing 2. When the cooler 1 is placed on the placement surface with the legs 50 in contact with the placement surface, the push switch 90 is pressed against the placement surface. In response to the push switch 90 pressed against the placement surface, the controller 36 causes power to be provided to the cooler 1 from the power tool batteries 17.

When the cooler 1 is tilted for movement or when the cooler 1 is lifted, the push switch 90 moves away from the placement surface. The controller 36 shuts power from the power tool batteries 17 to the cooling unit 30 while the push switch 90 is not being pressed against the placement surface. When the cooler 1 is moved or is lifted while the cooling unit 30 is in operation, the cooling unit 30 stops operating. This reduces failures in the compressor 31. In response to the cooler 1 on the placement surface and the push switch 90 being pressed, the cooling unit 30 restarts operation.

As described above, the cooler 1 according to the embodiment includes the main container 12 including the refrigeration compartment 11, the evaporator 33 on the main container 12, the compressor 31 and the condenser 32 adjacent to the main container 12, and the battery mounts 18 adjacent to the main container 12. The battery mounts 18 are located adjacent to the main container 12 and above the compressor 31 and the condenser 32. The user of the cooler 1 can easily attach and detach the power tool batteries 17 to and from the battery mounts 18 located above the compressor 31 and the condenser 32.

The battery mounts 18 in the cooler 1 receive the power tool batteries 17, from which the cooler 1 can receive power over a long period of time.

Each battery mount 18 includes the guides 182 to guide the power tool battery 17 in the up-down direction. Each power tool battery 17 includes the slides 173 to be guided by the guides 182. Each power tool battery 17 is slid in the up-down direction and attached to and detached from the battery mount 18. The user of the cooler 1 slides the power tool batteries 17 in the up-down direction to easily attach and detach the power tool batteries 17 to and from the battery mounts 18.

The compressor 31 and the condenser 32 are at different positions in the up-down direction. This prevents the cooler 1 from being upsized.

The cooler 1 includes the machinery compartment 40 accommodating the compressor 31 and the condenser 32. The compressor 31 and the condenser 32 are thus protected in the machinery compartment 40. This structure reduces deterioration of the compressor 31 and the condenser 32.

In the machinery compartment 40, the compressor 31 is located below the condenser 32. The compressor 31 weighs more than the condenser 32. Thus, the compressor 31 located below the condenser 32 improves the weight balance of the cooler 1.

The cooler 1 includes the intake fan 34 and the controller 36. The intake fan 34 causes air to flow into the machinery compartment 40. The compressor 31 is located below the intake fan 34 and the controller 36 in the machinery compartment 40. The intake fan 34, at least a part of the condenser 32, and at least a part of the controller 36 are at the same position in the up-down direction. This allows air drawn into the machinery compartment 40 by the intake fan 34 to flow around the controller 36. The air then cools the controller 36.

The intake fan 34 feeds air to the condenser 32 and to the controller 36. The air cools the refrigerant gas in the condenser 32. The air cools the controller 36.

The cooler 1 includes the exhaust fan 35 that causes air in the machinery compartment 40 to flow out. The compressor 31 is located below the exhaust fan 35 in the machinery compartment 40. The exhaust fan 35, at least a part of the condenser 32, and at least a part of the controller 36 are at the same position in the up-down direction. The air flowing through the condenser 32 and around the controller 36 smoothly flows out of the machinery compartment 40.

The cooler 1 includes the battery compartment 13 accommodating the battery mounts 18. The battery mounts 18 are thus protected in the battery compartment 13. This structure reduces deterioration of the battery mounts 18.

The battery mounts 18 are on the first inner surface 14A of the battery compartment 13. The user of the cooler 1 can thus smoothly attach and detach the power tool batteries 17 to and from the battery mounts 18.

The cooler 1 includes the battery compartment cover 4 that covers and uncovers the opening 16 of the battery compartment 13. With the opening 16 covered by the battery compartment cover 4, the battery mounts 18 are protected by the battery compartment cover 4. This structure reduces deterioration of the battery mounts 18. With the opening 16 uncovered, the user of the cooler 1 can smoothly attach and detach the power tool batteries 17 to and from the battery mounts 18.

The battery compartment 13 has the opening 16 at the top. The user of the cooler 1 can easily cover and uncover the opening 16 with the battery compartment cover 4.

The cooler 1 includes the output terminal 19 accommodated in the battery compartment 13. The output terminal 19 is thus protected in the battery compartment 13. This structure reduces deterioration of the output terminal 19. The output terminal 19 is not accommodated in the refrigeration compartment 11. The output terminal 19 can thus be used without uncovering the opening 15 of the refrigeration compartment 11.

With the output terminal 19 outputting power from the power tool batteries 17, the cooler 1 can charge the rechargeable battery in the electronic device.

The output terminal 19 is on the second inner surface 14B of the battery compartment 13. The user of the cooler 1 can thus smoothly connect and disconnect the electronic device to and from the output terminal 19. The output terminal 19 is located on the second inner surface 14B instead of being located on the bottom surface 14E of the battery compartment 13 to reduce foreign matter entering the output terminal 19. The battery mounts 18 are located on the first inner surface 14A, whereas the output terminal 19 is located on the second inner surface 14B different from the first inner surface 14A. In this structure, the power tool batteries 17 can remain on the battery mounts 18 when a USB cable is connected to the output terminal 19.

The battery compartment 13 has the hole 20 in the bottom surface 14E. The battery mounts 18 and the output terminal 19 are located above the hole 20 in the battery compartment 13. Water entering the battery compartment 13 can be discharged through the hole 20 under gravity. Water entering the battery compartment 13 may touch the battery mounts 18 or the output terminal 19 but may be discharged through the hole 20 under gravity. In this structure, water is less likely to remain on the battery mounts 18 and the output terminal 19.

The cooler 1 includes the refrigeration compartment cover 3 that covers and uncovers the opening 15 of the refrigeration compartment 11. With the opening 15 covered by the refrigeration compartment cover 3, the refrigeration compartment 11 is cooled. With the opening 15 uncovered, the user of the cooler 1 can smoothly place and remove products in and from the refrigeration compartment 11.

The refrigeration compartment 11 has the opening 15 at the top. The user of the cooler 1 can easily cover and uncover the opening 15 with the refrigeration compartment cover 3.

Other Embodiments

In the above embodiments, the output terminal 19 may output data stored in a memory. As described above, the controller 36 may include the memory including a nonvolatile memory or a volatile memory. The data stored in the memory may be output through the output terminal 19.

When the memory stores, for example, data about the operation history of the cooler 1, the operational history data may be output to a personal computer through the output terminal 19 and the USB cable. The user or maintenance personnel of the cooler 1 may use the operational history data for maintenance of the cooler 1.

REFERENCE SIGNS LIST 1 cooler
2 housing
2A front surface
2B rear surface
2C left surface
2D right surface
2E bottom surface
3 refrigeration compartment cover
3C seal
3L latch assembly
4 battery compartment cover
4L latch assembly
4R recess
5 caster
6 handle
7 carrier handle
7A arm
7B handle portion
7C connector
8 hinge assembly
9 hinge assembly
10 hinge assembly
11 refrigeration compartment
12 main container
12A first inner surface
12B second inner surface
12C third inner surface
12D fourth inner surface
12E bottom surface
13 battery compartment
14 battery container
14A first inner surface
14B second inner surface
14C third inner surface
14D fourth inner surface
14E bottom surface
14F step surface
15 opening
16 opening
17 power tool battery
18 battery mount
19 output terminal
20 hole
21 front housing
22 rear housing
23 frame housing
23A first opening
23B second opening
24 inlet
25 outlet
30 cooling unit
31 compressor
31C compressor controller
32 condenser
33 evaporator
34 intake fan
35 exhaust fan
36 controller
40 machinery compartment
50 leg
51 AC adapter
52 cover
53 cap opener
70 operation panel
71 power button
72 mode switch button
73 temperature setting button
74 display
80 tilt sensor
90 push switch
131 first space
132 second space
141 first bottom surface
142 second bottom surface
171 mount surface
172 housing
173 slide
174 protrusion
175 release button
176 power terminal
181 mount surface
182 guide
183 lock slot
184 power terminal
AX hinge axis
BX hinge axis
CX rotation axis
DX hinge axis
EX rotation axis
FX rotation axis
Pa retracted position
Pb in-use position

What is claimed is:

1. A cooler, comprising:
a housing including
a first housing,
a second housing connected to the first housing in a side-by-side relationship, and
an integral frame housing (i) connected to and surrounding an upper edge of the first housing and an upper edge of the second housing and (ii) having a first opening and a second opening in an up-down direction and side-by-side;
a main container including a refrigeration compartment, the refrigeration compartment having a refrigeration compartment opening that is contiguous with the first opening;
a refrigeration compartment cover (i) covering the refrigeration compartment opening in a closed position and (ii) above the main container in the up-down direction in the closed position;
an evaporator on the main container;
a compressor and a condenser adjacent to the main container;
a battery container (i) including a battery compartment and (ii) having a battery container opening that is contiguous with the second opening;
a battery compartment cover (i) covering the battery container opening in a closed position and (ii) above the battery container in the up-down direction in the closed position; and
at least one battery mount (i) located on a first inner surface of the battery compartment, (ii) configured to receive a power tool battery in a detachable manner, (iii) adjacent to the main container and above the compressor and the condenser in the up-down direction and (iv) including a guide configured to engage a slide of the power tool battery such that the guide interacts with the slide to guide the power tool battery to slide in the up-down direction to be attached to and detached from the at least one battery mount.

2. The cooler according to claim 1, wherein the at least one battery mount comprises a plurality of battery mounts.

3. The cooler according to claim 1, wherein the compressor and the condenser are at different positions in the up-down direction.

4. The cooler according to claim 1, further comprising: a machinery compartment accommodating the compressor and the condenser.

5. The cooler according to claim 4, wherein the compressor is below the condenser in the machinery compartment.

6. The cooler according to claim 5, further comprising: an intake fan configured to cause air to flow into the machinery compartment; and
a controller,
wherein the compressor is below the intake fan and the controller in the machinery compartment.

7. The cooler according to claim 6, wherein the intake fan is configured to feed air to the condenser and to the controller.

8. The cooler according to claim 5, further comprising: an exhaust fan configured to cause air to flow out of the machinery compartment,
wherein the compressor is below the exhaust fan in the machinery compartment.

9. The cooler according to claim 1, further comprising: an output terminal accommodated in the battery compartment.

10. The cooler according to claim 9, wherein the output terminal is configured to allow output of power from the power tool battery.

11. The cooler according to claim 9, wherein the output terminal is configured to allow output of stored data.

12. The cooler according to claim 9, wherein the output terminal is on a second inner surface of the battery compartment.

13. The cooler according to claim 9, wherein the battery compartment has a hole in a bottom surface of the battery compartment, and
the at least one battery mount and the output terminal are above the hole in the battery compartment.

* * * * *